Figures 1, 2, 3:
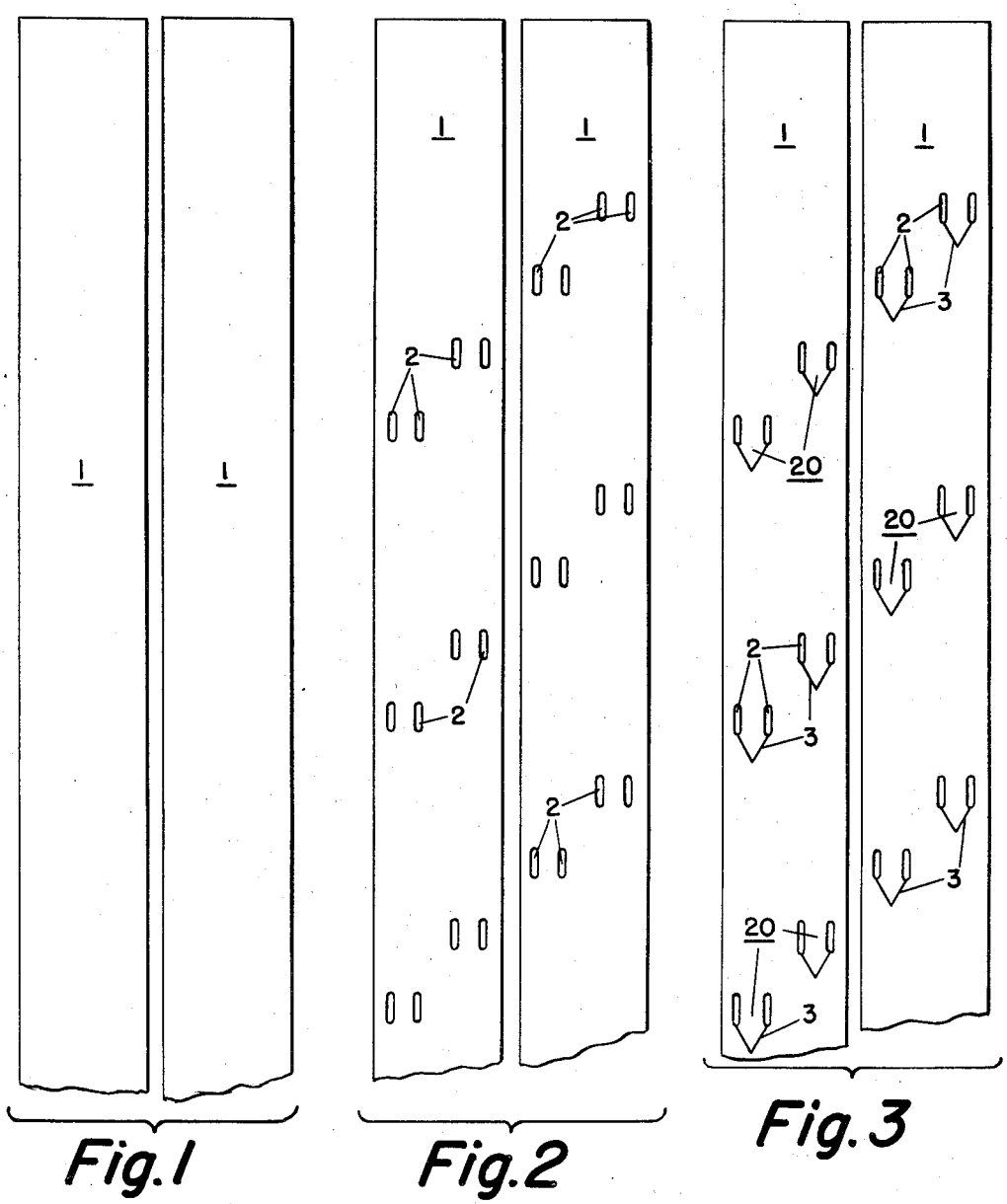

June 9, 1959 — L. M. SEELY — 2,889,614
METHOD OF MAKING TUBULAR, PRONGED REINFORCING MEMBERS FOR ROCK STRATA
Original Filed June 23, 1954 — 5 Sheets-Sheet 1

INVENTOR.
LLEWELLYN M. SEELY
BY
ATTORNEY

June 9, 1959 L. M. SEELY 2,889,614
METHOD OF MAKING TUBULAR, PRONGED REINFORCING
MEMBERS FOR ROCK STRATA
Original Filed June 23, 1954 5 Sheets-Sheet 2
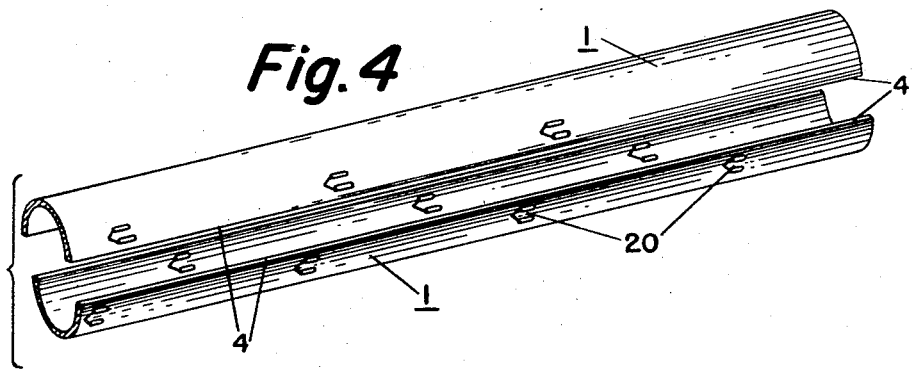
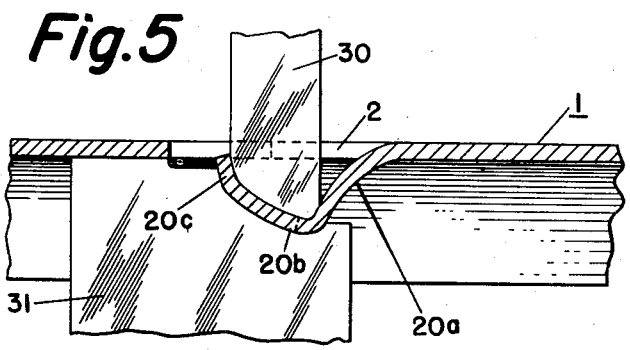
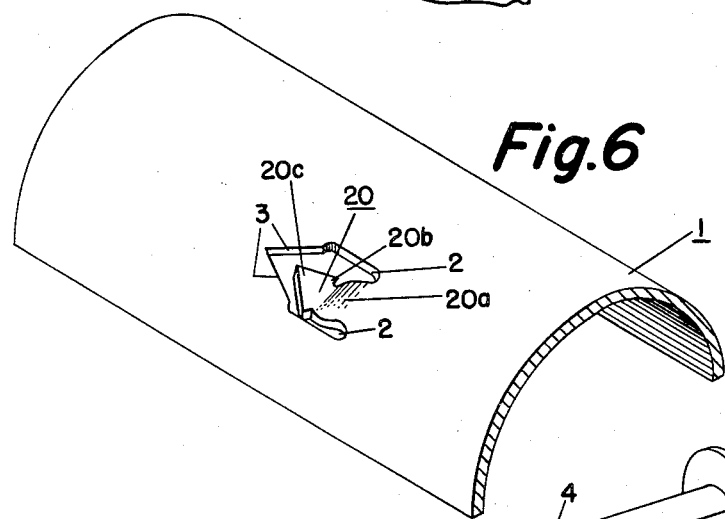
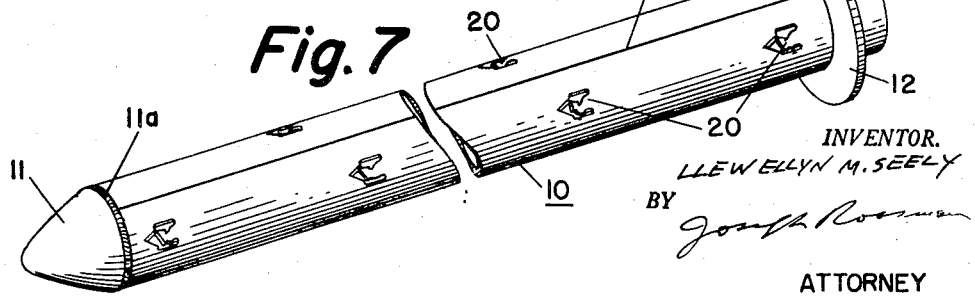
INVENTOR.
LLEWELLYN M. SEELY
BY
ATTORNEY June 9, 1959 L. M. SEELY 2,889,614
METHOD OF MAKING TUBULAR, PRONGED REINFORCING
MEMBERS FOR ROCK STRATA
Original Filed June 23, 1954 5 Sheets-Sheet 3

INVENTOR.
LLEWELLYN M. SEELY
BY
ATTORNEY

June 9, 1959    L. M. SEELY    2,889,614
METHOD OF MAKING TUBULAR, PRONGED REINFORCING
MEMBERS FOR ROCK STRATA
Original Filed June 23, 1954    5 Sheets-Sheet 4
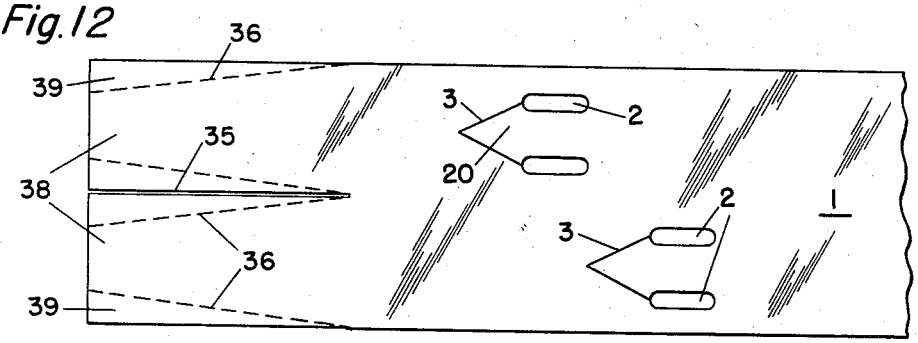
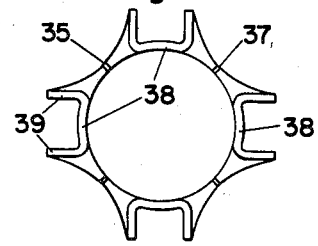
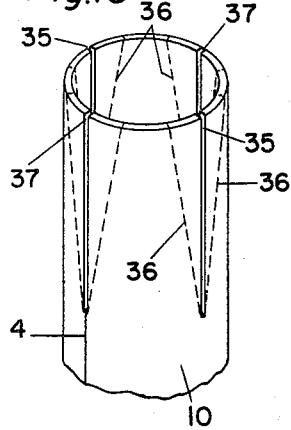
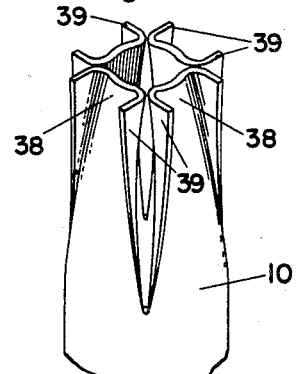
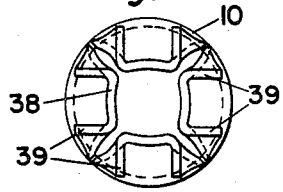
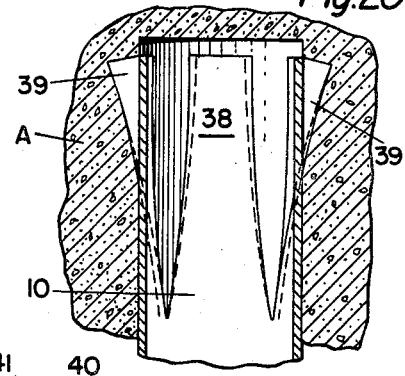
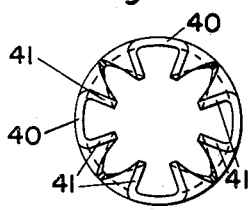
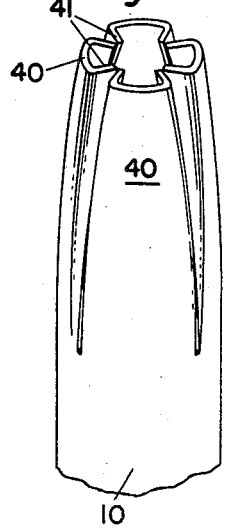
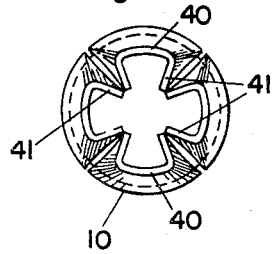
INVENTOR,
LLEWELLYN M. SEELY
BY
ATTORNEY

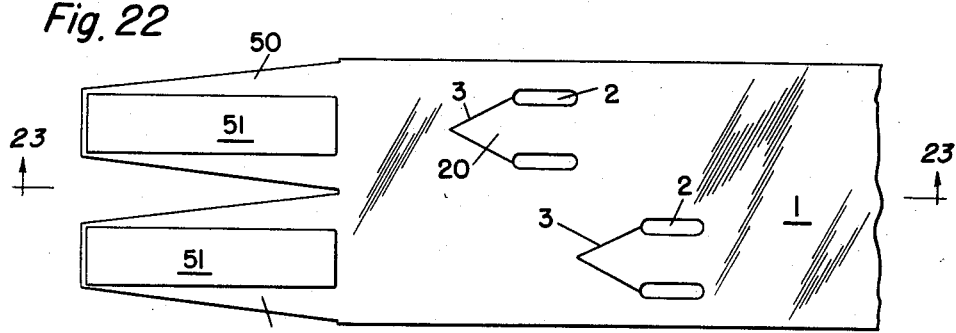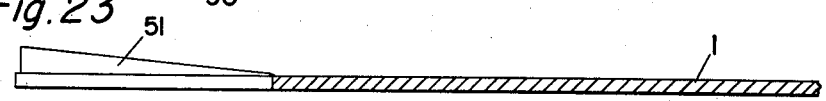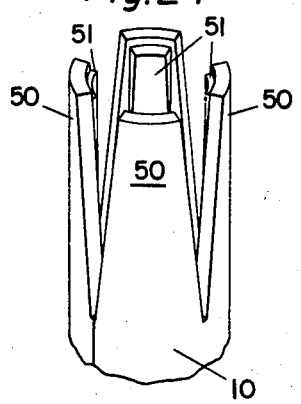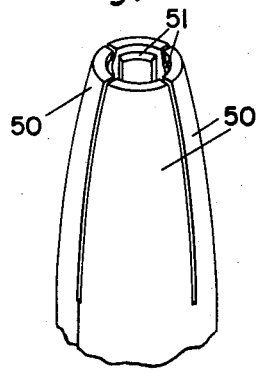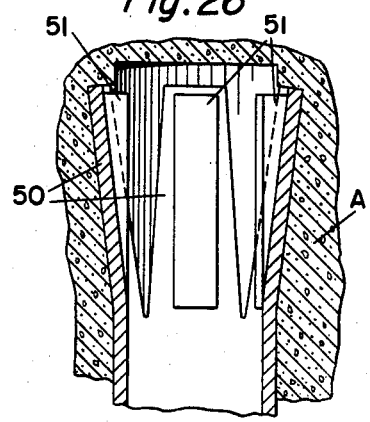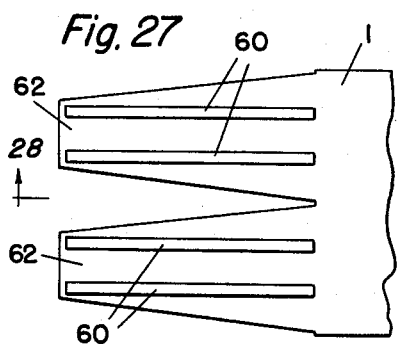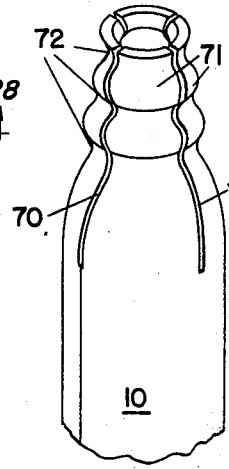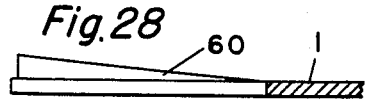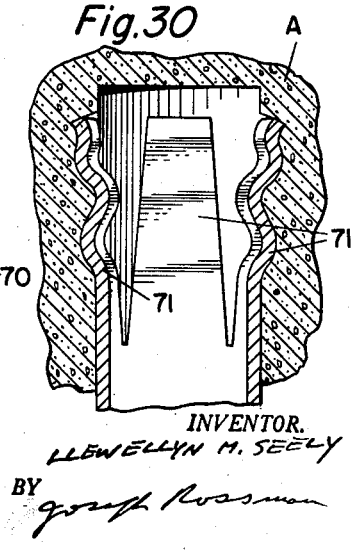

United States Patent Office 2,889,614
Patented June 9, 1959

2,889,614

METHOD OF MAKING TUBULAR, PRONGED REINFORCING MEMBERS FOR ROCK STRATA

Llewellyn M. Seely, Philadelphia, Pa., assignor to Super-Grip Anchor Bolt Company, Inc., a corporation of Pennsylvania Original application June 23, 1954, Serial No. 438,832, now Patent No. 2,804,797, dated September 3, 1957. Divided and this application July 5, 1957, Serial No. 670,250

7 Claims. (Cl. 29—155)

This invention relates to reinforcing members or anchors insertable in holes drilled in the roof rock strata of mines, tunnels, and the like for binding the strata together to minimize flexure and thus prevent rock failure, thereby eliminating the necessity of conventional external timbering or other reinforcing means.

This application is a division of application Serial No. 438,832 filed June 23, 1954, now Patent No. 2,804,797, September 3, 1957.

During recent years the use of reinforcing bolts or anchors for reinforcing roofs and walls in mines has greatly increased. Until the advent of modern drilling with carbide alloy insert bits, the cost of drilling holes in hard rock was a deterrent to serious consideration of bolting as part of a procedure for systematic ground support. Because of this high cost the tendency was to limit drilling wherever possible. Development of mechanized mining methods and equipment has only recently progressed to the point where the use of a new systematic means of ground support became a necessity for efficient operation. In fact, mechanization was being retarded by the use of bulky conventional supports that restricted the maneuverability of equipment.

The basic difference between bolting and conventional support is sometimes overlooked. Successful bolting depends upon being able to make the ground itself an integral part of the support structure, whereas with conventional supports one assumes that failure of the ground is inevitable and prepares to support the ground within certain limits beyond which the ground is considered to be self-supporting.

In general, the reinforcing bolts now in use in mines consist simply of steel rods either ¾ inch or 1 inch in diameter and 24 inches to 8 feet in length, having an anchoring device at one end and a nut and a bearing plate on the other end. The diameter of the drill hole is made sufficiently large to accommodate the fastening device, and by a bearing plate, placed over the collar of the hole, the rod is loaded in tension. Inasmuch as the portion of the rod between the anchoring device and the bearing plate does not usually touch the perimeter of the drill hole, it is best to assume that no force other than tension is applied between these two points. This tension in the rod results in compressing the rock between the anchor and the collar of the hole.

From the standpoint of utilization by the engineer the following classifications of bolting applications appear to be most common:

(1) Suspension; pinning a loose piece of rock to ground considered self-supporting.

(2) Beam building; using bolts to cause a series of beds with little or no bond between them to act as a monolith. By reducing this action of the beds to that of a monolith stresses are reduced to a value which the beds can safely resist. This type of bolting is used principally in rectangular openings.

(3) Reinforcement of the skin areas of an arched opening to provide additional support to counteract the effects of tensile, compressive, and shear stresses.

(4) Reinforcing walls against stresses that are totally or dominantly shear and compression.

Suspension type of bolting is used with no particular pattern to secure single pieces of loose or questionable material in areas that are otherwise considered self-supporting. Such bolts should, of course, be strong and have sufficient anchorage to support the estimated weight of the ground under question with a factor of safety of at least 3 to compensate for uncertainties of anchorage and load.

So-called beam-building in rock strata involves two aspects. The first is that roof bolts may be used in stratified and loosely consolidated rocks to bind them together so that collectively they act as a single beam rather than a series of separate beams. Second, with the conventional bolts (slotted type and expansion shell type) an undesirable disturbance of the strata is brought about by the action of the bolt at its anchorage. This occurs because anchoring these bolts properly (so the anchorage will develop the full strength of the bolt) requires the exertion of a tremendous thrust against the rock forming the side of the drill hole. This thrust acts normal to the long axis of the drill hole and tends to create a fissure in the rock at the place of anchorage, the fissure extending parallel to the stratification which usually also will be parallel with the roof surface of the passageway supported. In pattern bolting these fissures from the individual bolts connect and form a continuous weak horizon segregating the monolith, formed by the bolting, from the rock above. Therefore, with these bolts, it is important that no dependence should be placed upon the hanging or "suspension" of a weak shale by drilling a few inches into a massive and strong formation above; the bolts should be of sufficient length that the total thickness of the resulting monolith renders the beam self-sufficient.

As previously stated, in supporting the roof of a mine passageway or other underground working, anchor bolts are usually set in holes drilled in the roof strata which engage cross beams or bearing plates for holding the latter in supporting position against the roof, thereby to bind the strata together to prevent rock failure. In the conventional types of roof anchors which are secured by expanding the head portions thereof, there is a possibility of slippage of the anchors in the holes due to the comparatively small surface contact of the anchor heads with the walls of the holes so that the supports are sometimes torn loose presenting the danger of roof-falls or cave-ins.

Furthermore, even if the conventional type anchor bolt does initially provide sufficient anchorage, the bolt is then put under great stress by tightening the nut against the plate to a required number of foot pounds, thereby creating a stress or tensile pull on the bolt. It is necessary by government regulation to bring the tension of these bolts up to near creep strength because of the required foot pounds on the nut. Under such great stress exerted on the bolt, up to or very near the creep strength of the bolt, any side pressure caused by any movement or force exerted by the rock strata at or near 90° angle to the axis of the bolt may snap or rupture the bolt. The disadvantages of the conventional bolts previously described are overcome by the present invention. The reinforcing member or anchor provided in accordance with the present invention cannot break due to lateral movement of rock strata or pressure exerted under previously described circumstances because there is no stress created on the anchor from end to end except at the local support of one layer of strata to another. No additional stress is added to the anchor such as by tightening a nut at the end of the anchor. The present anchor construction under similar conditions as outlined above will therefore merely crush or flatten, but will retain all of the original tensile strength of the metal.

Furthermore, the commonly used expansion shield used with conventional bolts is of considerably larger diameter than the bolt that is used in connection with it. For instance, the standard ¾ inch bolt used with a standard expansion head 1⅜ inch diameter forms an air chamber up and down the entire length of the bolt. The induction of air into the deep rock strata in such air space causes chemical changes to take place, for instance, such as air slacking of lime stone in certain rock strata. The rock strata will thus weaken and collapse. According to the present invention the reinforcing anchor fits the drilled hole snugly so that no air chamber is formed at the wall of the hole. The present anchor construction is particularly effective to support the roof of the tunnel in rock strata that are too soft or of such a nature that the commonly used expansion shield cannot create a sufficient anchorage.

The present invention contemplates improvements over known types of reinforcing anchors in that an improved anchor structure is provided which engages the walls of the hole in the rock strata at numerous points substantially along the entire length of the anchor so that slippage or tearing loose of the anchor is substantially avoided. The anchor bolt of the present invention is of tubular form substantially fitting the hole drilled in the rock strata and has numerous laterally bendable or expansible tooth portions along substantially its entire length, as well as at its head portion, and such portions are bendable outwardly by suitable expander means movable axially within the tube, into firm gripping engagement with the hole walls. For reasons of economy some holes are drilled using an oversize drill for perhaps half of the depth of the hole. The hole is then finished with the proper size drill. According to the present invention it is possible to provide teeth on the tube of varying lengths so that they will when expanded project at varying lengths and therefore accommodate the variation in the diameter of the hole from top to bottom. The anchor of the present invention thus not only firmly grips the hole walls along substantially the entire length of the hole, but is also comparatively simple and rugged in design, well adapted for the purpose for which it is intended. It firmly binds together rock strata to minimize flexure thereby preventing rock failure, relative slipping of the strata, failure and roof-falls.

The present invention also provides gripping portions at the upper end of the anchor bolt which can be expanded by the same tool which expands the lateral tooth portions so as to securely anchor the head of the bolt as well as its lateral teeth.

Further details and advantages of the invention will be apparent from the following specification and accompanying drawings, wherein—

Figure 3A:
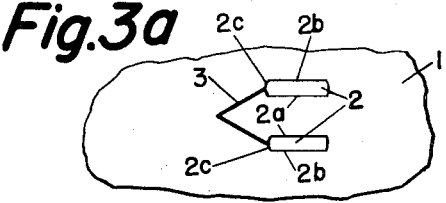
Figure 8:
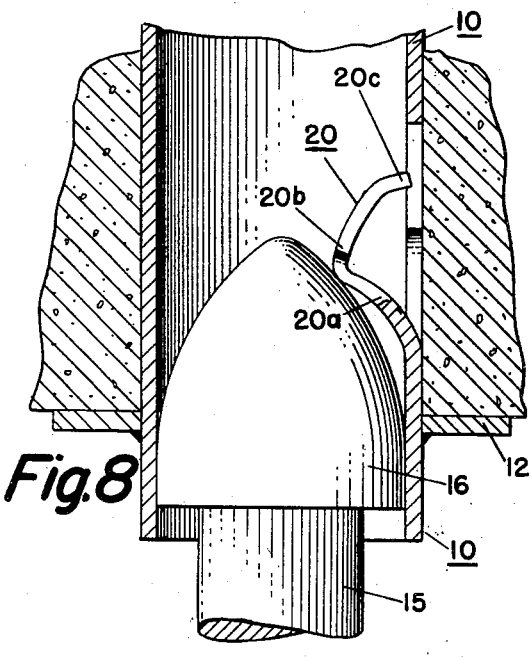
Figure 9:
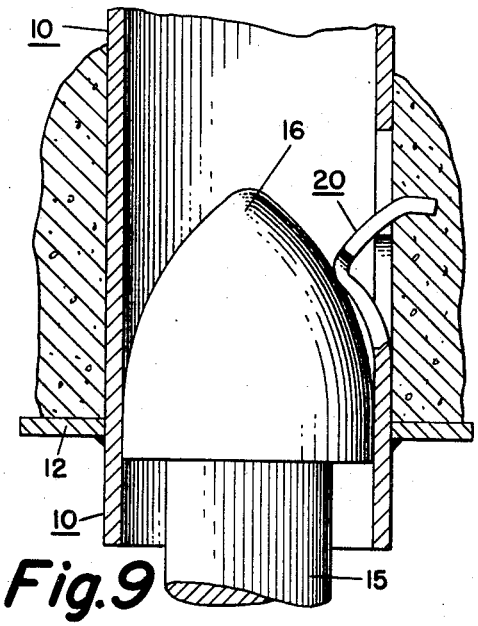
Figure 10:
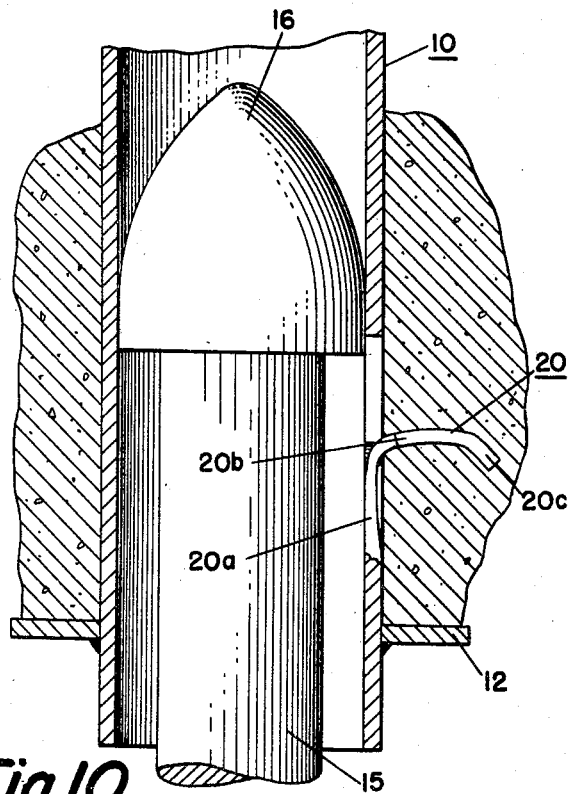
Figure 11:
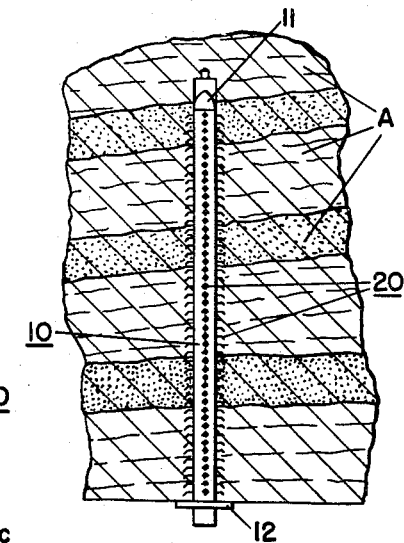

Figure 1 is a plan view of two steel blanks used for making a reinforcing member or anchor in accordance with this invention, Figure 2 is a plan view of the two steel blanks shown in Figure 1 after being punched with a plurality of apertures, Figure 3 is a plan view similar to Figure 2 showing a further stage in processing the blank, Figure 3A is an enlarged view of a portion of the blank shown in Figure 3, Figure 4 is a perspective view of the blanks shown in Figure 3 after being shaped into semi-cylindrical shells and about to be joined together into tubular form, Figure 5 is a fragmental enlarged sectional view showing the action of a punch in forming teeth in the shells, Figure 6 is a perspective enlarged fragmental view of a blank showing details of the tooth structure, Figure 7 is a broken perspective view of the completed reinforcing anchor, Figure 8 is an enlarged fragmental sectional view illustrating the anchor positioned in a hole drilled in rock strata before the teeth are bent into locking engagement, Figure 9 is a view similar to Figure 10 showing the teeth at one stage of being bent outwardly into locking engagement with the walls of the hole, Figure 10 is a view similar to Figure 9 showing the final locked position of the teeth, Figure 11 is a sectional vertical view of rock strata in which a hole has been drilled and an anchor inserted and locked in final position for reinforcing the rock strata, Figure 12 is a plan view of a portion of a steel blank similar to the one shown in Figure 3 but provided with additional cuts to form a gripping head portion, Figure 13 is a perspective fragmental view of the head portion of a modified anchor construction formed from the blank shown in Figure 12 at one stage of its production, Figure 14 is a plan view of the anchor construction shown in Figure 13 at a later stage of making same showing the wing portions bent outwardly, Figure 15 is a plan view of the anchor construction shown in Figure 14 in its finished stage showing the wing portions bent inwardly of the periphery of the anchor tube, Figure 16 is a perspective fragmental view of the finished head portion of the modified anchor construction produced from two blanks as shown in Figure 12 by the successive stages shown in Figures 13 to 15, Figure 17 is an end view of the head portion of another modified anchor construction made from blanks as shown in Figure 12, Figure 18 is a plan view of the head portion of the finished anchor of Figure 17, Figure 19 is a perspective fragmental view of the head or upper end of the same modified anchor construction made from the blank shown in Figure 12 through the successive stages illustrated in Figures 17 and 18, Figure 20 is a vertical fragmental sectional view showing the head portion of the modified anchor construction illustrated in Figure 16 in expanded locked condition after insertion in a drilled hole for anchoring the head portion in rock strata, Figure 21 is a fragmental vertical sectional view of the modified anchor construction shown in Figure 19 in expanded locked condition for embedding the wing portions in the rock strata, Figure 22 is a plan view of a modified steel blank construction for forming a still further modified anchor construction, Figure 23 is a sectional view taken on lines 23—23 of Figure 22, Figure 24 is a perspective fragmental view of the head portion of a further modified construction of an anchor made from the blank shown in Figure 22 at an initial stage of its manufacture, Figure 25 is a perspective fragmental view of the head portion of the finished anchor construction shown in Figure 24, Figure 26 is a vertical sectional view of an anchor inserted in a hole drilled in rock strata and in expanded condition for anchoring the head of same, Figure 27 is a fragmental plan view of another modified blank construction showing pairs of spaced wedges, Figure 28 is a sectional view taken on lines 28—28 of Figure 27, Figure 29 is a perspective fragmental view of the head portion of still another modified anchor construction, and Figure 30 is a vertical sectional view of the anchor shown in Figure 29 in expanded locked condition in the hole drilled in rock strata.

Referring to the drawings, Figure 11 illustrates a plurality of rock strata A in a mine roof or passageway which it is desired to reinforce so as to avoid failure or collapse of same. A hole of suitable diameter and depth is drilled in the rock strata A so as to snugly receive an anchor element 10 as illustrated in Figure 7. The nose portion 11 of the anchor serves to guide the anchor during insertion in the hole. The collar portion 12 abuts the exposed rock layer as shown in Figure 11. A tool 15 provided with a snub-nose 16 of suitable contour and dimensions is then inserted in the anchor and suitably pushed upwardly by being propelled mechanically or by a power device through the bore of the anchor so as to force outwardly the series of internally extending teeth 20 provided in the anchor into locking engagement with the rock strata A. A suitable number of such anchors are inserted in the rock strata depending upon the extent of reinforcement desired.

The anchors function to bind the strata together to minimize flexure and thus prevent rock failure. Under certain conditions bearing plates may be provided at the lower ends of the anchors or they may directly engage the strata as shown in Figure 11, and also, instead of the individual bearing plates, the anchors may engage continuous plates or cross beams at points along the length of the latter. The holes drilled in the strata may be vertically disposed as shown or may be relatively inclined at angles from the horizontal ceiling of the tunnel or located in any desired manner to suit the particular conditions encountered.

Now referring to the embodiment shown in Figure 10, it will be noted that the improved reinforcer or anchor is in the form of an elongated cylindrical sleeve or hollow tube 10 of substantially uniform bore which is shaped to fit closely the walls of the hole. The tubular body of the anchor is formed as will be explained later so that numerous laterally bendable locking fingers or gripping teeth 20 are arranged in separated relation in straight vertical rows or in spiral relation along substantially the full length of the tube so that any tooth has substantial bearing in relation to the next tooth above or below it. In other words, the teeth are positioned in the anchor so as to be in offset and spaced relation to each other for engaging the rock strata. The gripping teeth are desirably arranged in four or more spaced longitudinal rows and normally lie flush with the exterior walls of the tube but when expanded move outwardly from the tube walls to embed themselves in the walls of the hole as later explained.

In making the anchor according to the present invention, steel blanks 1 are provided of suitable dimensions, as shown in Figures 1 to 3. The blanks are first punched to provide a series of rows of spaced substantially rectangular apertures 2 positioned in pairs and in staggered relation to adjacent rows of apertures, as shown in Figure 2. The blanks are then provided with a plurality of pairs of slits 3 which originate from each pair of the rectangular apertures and are positioned symmetrically at an angle to the apertures 2 so as to intersect and define triangular tongue portions 20. Referring to Figure 3A it will be noted that the slits 3 intersect the medial portion of the ends 2c of the apertures 2. If desired, the slits 3 may be positioned so as to intersect the outer defining walls 2b of apertures 2. The slits 3 define the tongue portions 20 which are formed as will be explained later. Each of the blanks 1 is then suitably shaped into curvilinear contour, preferably to form a half shell of a cylindrical tube, as shown in Figure 4. The shaped punched and slit semi-cylindrical shells are then placed in a suitable press, as shown in Figure 5, wherein coacting members 30 and 31 depress and form the tongue portions 20 in the areas defined by the pairs of apertures 2 and slits 3. The assembled semi-cylindrical shells are then suitably joined together such as by welding their abutting longitudinal edge portions 4 so as to form a continuous cylindrical tube or reinforcing member 10, as shown in Figure 7. A separately formed snub-nose or torpedo-shaped portion 11 is provided at one end of the reinforcing member or anchor 10 and is suitably welded thereto at 11a. A collar portion 12 is also provided adjacent the opposite external end of the anchor which is suitably welded thereto. The collar portion may be circular or have any desired shape such as square, rectangular, etc.

One of the important features of the present invention resides in the specific construction of the tooth portions 20 which are illustrated in greater detail in Figures 5, 6, 8 to 10. When the tongue portions defined by apertures 2 and slits 3 are depressed and shaped by the punch elements 30 and 31, as shown in Figure 5, the portion of the tongue indicated by numeral 20a will be slightly stretched during the forming operation. The metal at this region is later rebent into its original position when the teeth 20 are bent outwardly of the anchor as shown in Figure 10. The metal portion 20a is thus "worked" by the successive bending operations so that it tends to be hardened in this portion. It will also be noted that as the teeth 20 are formed and simultaneously bent inwardly, wing portions 20b and pointed portions 20c are automatically formed, as shown in Figure 6. These wing portions 20b can be readily folded outwardly of the apertures formed in the anchor from their successive positions shown in Figures 8 to 10 when the tool 15 is pushed through the bore of the anchor so that the torpedo portion 16 thereof acts as a means to refold the teeth portions at their portions 20c outwardly of the anchor so as to extend beyond the apertures 2. It will be noted, however, that after the teeth 20 are folded outwardly and the pointed portions 20c are anchored in the rock strata as shown in Figures 10 and 11, they cannot be forced or bent inwardly through the apertures in the anchor because the wing portions 20c will contact or abut the external area of the anchor adjacent the apertures and thus prevent folding back of the teeth 20 inwardly of the anchor. This construction of the teeth thus ensures permanent locking of the teeth in the rock strata as the weight of the strata, if slipping or subsidence of same should occur, will nevertheless not force or bend the teeth 20 inwardly of the anchor.

As previously explained, the teeth are arranged so as to provide suitable bearing support or anchorage throughout the entire length of the anchor. The teeth may be arranged in a plurality of spaced rows or in spiral fashion. They are preferably arranged in spaced offset relation to each other so as to ensure engagement and reinforcement of the rock strata at spaced points throughout the entire length of the hole in which the anchors are positioned. The anchors are preferably of substantially uniform diameter. The teeth may also be made of varying width, length and size in the same anchor as previously explained by merely suitably changing the dimensions and spacing of the selected apertures 2 and slits 3. The teeth may be triangular in shape or any other desired shape and contour embodying the novel features of this invention. It is obvious that the teeth may be positioned at any desired angle to the axis of the anchor. They may also be suitably positioned so as to be bendable or set into engagement with the rock strata by means of a setting tool from the bottom upwardly or from the top downwardly as may be desired.

The anchor may be made of any suitable length, for example, from 2 feet to 10 feet in length and 1⅞₁₆ inches outside diameter. The steel plate blanks previously described which are used may be, for example, 12 gauge or .096 inch thickness. Other suitable dimensions may obviously be used as desired. The number of teeth per foot length of the anchor may be 12 or more as may be desired.

In addition to the lateral teeth portions which have been previously described, I may provide the head of my anchor with bendable anchoring portions which are adapted to be bent outwardly when a suitable tool is used for anchoring such portions in the adjacent walls of the drilled hole in the rock strata. The bendable portions are also formed so as to extend inwardly of the periphery of the tube anchor before use in the same manner as the lateral teeth portions 20 previously described. The same tool which is used to bend the lateral teeth portions 20 can be used also to expand outwardly of the tube the outwardly bendable anchoring portions at the head of the anchor.

A number of specific constructions may be utilized for providing the head with bendable anchor portions which are shown in the illustrative embodiments of Figures 12 to 30 inclusive. In each of these constructions the same principle is utilized, that is, the anchor is provided with gripping portions at its head which are initially bent inwardly of the periphery of the anchor tube and are adapted to be bent outwardly of the anchor after it is inserted in a drilled hole in rock strata so as to project into and engage with the lateral side walls of the hole in which the anchor is positioned.

One such modification is illustrated in Figures 12 to 16 wherein the anchor is formed from two blanks, one of which is illustrated in Figure 12 and is indicated by numeral 1. The steel blank is provided with rectangular apertures 2 and intersecting slits 3 in the same manner as described in connection with Figure 3. One end of the blank is additionally slit for a short distance along the line 35 to provide bendable segments or portions 38. The anchor is then formed from two blanks 1 in the same manner as previously described in connection with the construction shown in Figure 4, that is, the two blanks 1 are shaped into semi-cylindrical shells, the lateral teeth 20 are then formed, and the two shells are then welded together to form a tube 10 as shown in Figure 13. Wing portions 39 are then folded outwardly of the periphery of the tube along fold lines 36 as shown in Figure 14 so as to provide a plurality of tapered triangular shaped outwardly extending wing portions 39 at the upper end of the anchor connected by segments 38. The upper segments 38 of the tube are then folded inwardly toward each other as shown in Figure 16 to form a tapered head so that the outer extremities of the wing portions 39 do not extend beyond the periphery of the anchor 10 as illustrated in Figure 15. If desired, the wing portions 39 may be folded on lines 36 when the blanks 1 are flat and before they are shaped into shells.

In using the anchor construction described, the expanding tool which is used to expand the lateral teeth 20 of the tube 10 will also impinge upon the inwardly bent segment portions 38 and will cause them to expand outwardly beyond the periphery of the tube so as to force the wing portions 39 to enter and engage the rock strata A as shown in Figure 20. The head of the anchor will thus be securely retained and locked in the rock strata.

A further modification of the head portion of my anchor is illustrated in Figures 17 to 19 wherein the head of the anchor is formed from a blank similar to the one illustrated in Figure 12 except that instead of bending the wing portions 39 outwardly of the tube as shown in Figure 14, they are bent inwardly as illustrated in Figure 17 to form tapered triangular wing portions 41 directed inwardly of the periphery of the tube and connected by the tube segments 40. The tube segments 40 are then bent inwardly of the periphery of the tube 10 as illustrated in Figure 19 to form a tapered head portion. In using this modified anchor construction, the same tool which is used to expand the lateral teeth 20 will also impinge upon the inwardly directed wing portions 41 and thereby force the upper portions of segments 40 to bite into and engage with the walls A of the hole drilled in the rock strata, thereby providing a secure and firm grip of the head of the bolt.

A further modified head construction of my anchor is illustrated in Figures 22 to 26. The anchor is made from a metal blank 1 similar in construction as illustrated in Figure 3 having rectangular openings 2 and intersecting slits 3 so as to provide the lateral teeth portions 20 previously described. One end of the blank is cut so as to provide substantially triangular wing portions 50. Suitable metal lugs or wedges 51 are welded or otherwise affixed to each of the wing portions 50. It will be observed that the lugs 51 are inclined inwardly from the end of the tube so that the greater dimension is at the upper end of the tube. The anchor is made from two blanks as illustrated in Figure 22 in the same manner as has been previously described in connection with the anchor construction shown in Figure 7 so as to provide a tubular anchor by welding two of the blanks together after they have been previously shaped and the lateral teeth have been formed therein. The head portion of the anchor so formed will then have the appearance shown in Figure 24 having four spaced wing portions 50. The wing portions 50 are then folded inwardly to provide a tapered nose for the anchor as shown in Figure 25.

In use, such anchor construction is inserted in a drilled hole in rock strata and the tool which is used to expand the lateral teeth in the anchor will also contact the lugs 51 and will expand them outwardly of the periphery of the tube, as illustrated in Figure 26, so as to cause wing portions 50 to embed and anchor in the walls of the hole drilled in the rock strata A. Instead of using a single lug 51 as shown in Figure 22, I may use a pair of relatively narrow lugs 60 for each of the wing portions, as illustrated in Figures 27 and 28, which will function to expand the head of the tube. By using relatively narrow lugs 60 a saving in metal may be accomplished as compared with the larger lugs 51 shown in Figure 22.

A further modified construction of the head of my anchor is illustrated in Figures 29 and 30 wherein the upper end of the tube is slit to provide a plurality of bendable portions 71 which are provided with corrugated formations indicated by numeral 72. Portions 71 are folded inwardly of the periphery of the tube 10 to form a tapered head. The portions 71 are adapted to be folded outwardly by the same tool which is used to bend the lateral teeth 20 in the side walls of the anchor as previously described. The outwardly extending portions 71 of the tube will anchor into the walls of the hole to provide a firm grip for the head of the anchor.

It is obvious that many modifications may be made in the head or upper end of the anchor tube so as to provide bendable portions which can then be bent outwardly of the periphery of the anchor after insertion in a drilled hole so as to retain the head of the anchor in the hole in which it is inserted. The opposite or lower end of the anchor may also be provided with means if desired for retaining same by bolts, studs and the like against the outer exposed rock layer through which the anchor is inserted for reinforcing same. The lower end of the tube may for example be threaded both externally or internally if desired for receiving nuts on the outer male threads on the tube or for receiving stud bolts for engaging with the female threads at the end of the tube. Such nuts or studs may be used to retain externally supported timber or channels for reinforcing the exposed rock strata. Also instead of providing the collar portion or plate 12 at the end of the anchor as illustrated in Figure 7, I may provide other retaining means such as a wedge which may extend through two opposed openings adjacent the end of the anchor tube or any other similar retaining means.

The present anchor construction is especially adapted for reinforcing rock strata which are of such character, e.g. too soft, porous or fragile, as not to be able to securely retain conventional reinforcing members or members used with expansion shields or other auxiliary retaining means. The present anchor construction provides a plurality of teeth which can be bent into such rock strata into secure engagement therewith so as to provide adequate bearing support for the portions of the rock strata adjacent the teeth and anchor portions whereby collapse or failure of the rock strata is avoided.

My invention provides an improved reinforcing member or anchor for rock strata support in mine passageways or other underground workings and tunnels whereby the rock strata may be rigidly supported without the use of conventional external timbering. By the provision of the expansible or bendable gripping teeth arranged along substantially the entire length of the anchor the latter may grip the hole walls at a multiplicity of points substantially along the entire length of the hole so that the possibility of slippage or tearing loose of the anchor is substantially avoided. By the provision of a multi-contact reinforcer or anchor of the character disclosed the rock strata may be firmly bound together thereby minimizing flexure and thus preventing rock failure. By the provision of the spreader tool the anchor tube may be quickly and easily anchored in place and the spreader tool may be removed and reused at other locations. The anchor is of a rugged and durable structure and is inexpensive in design, thereby not only providing an effective rock support, but also at a minimum cost. These and other uses and advantages of the invention will be clearly apparent to those skilled in the art.

My invention may be modified and embodied in various other forms without departing from its spirit or the scope of the appended claims.

I claim:

1. The method of making reinforcing tubular members which comprises providing a plurality of flat metal blanks, punching said blanks to provide a plurality of pairs of rectangular apertures, slitting said blanks along pairs of intersecting slit lines terminating at said apertures, shaping said blanks to form semi-cylindrical shell portions, inwardly pressing and shaping portions of the blank defined by said apertures and slit lines to provide tooth portions extending inwardly of each shell portion, and joining pairs of said shell portions along the longitudinal abutting edge portions thereof to form a continuous tubular member.

2. The method of making reinforcing tubular members which comprises providing a plurality of flat metal blanks, punching said blanks to provide a plurality of rows of pairs of rectangular apertures in staggered relation, slitting said blanks along pairs of intersecting slit lines terminating at said apertures to define bendable triangular tooth portions, shaping said blanks to form semi-cylindrical shell portions, inwardly pressing and shaping portions of the blank defined by said apertures and slit lines to provide tooth portions extending inwardly of each shell portion, and joining pairs of said shell portions along the longitudinal abutting edge portions thereof to form a continuous tubular member.

3. The method of making reinforcing tubular members which comprises providing a plurality of flat metal blanks, slitting one end of each of the blanks to provide bendable portions, bending edge portions of the slits in said blanks and simultaneously bending portions surrounding said edge portions and within the area defined by said slits, to form anchor portions, shaping said blanks to form semi-cylindrical shell portions, joining pairs of said shell portions to form tubular members and bending the said anchor portions inwardly of the periphery of the tube.

4. The method of making reinforcing tubular members which comprises providing a plurality of flat metal blanks, slitting one end of each of the blanks to provide bendable portions folding portions of the blanks adjacent said slits to form triangular anchor portions, bending edge portions of the slits in said blanks and simultaneously bending portions surrounding said edge portions and within the area defined by said slits, shaping said blanks to form semi-cylindrical shell portions, joining pairs of said shell portions to form tubular members and bending the said anchor portions inwardly of the periphery of the tube.

5. The method of making reinforcing tubular members which comprises providing a plurality of flat metal blanks, slitting one end of each of the blanks to provide bendable portions, attaching wedge-shaped portions to said bendable portions, shaping said blanks to form semi-cylindrical shell portions, joining pairs of said shell portions to form tubular members having said wedge-shaped portions positioned internally of the tube, and bending said bendable portions inwardly of the periphery of the tube.

6. The method of making reinforcing tubular members which comprises providing a plurality of flat metal blanks, slitting one end of each of the blanks to provide bendable portions, corrugating said bendable portions, shaping said blanks to form semi-cylindrical shell portions, joining pairs of said shell portions to form tubular members, and bending said corrugated portions inwardly of the periphery of the tube.

7. The method of making reinforcing tubular members which comprises providing a plurality of flat metal blanks, punching said blanks to provide a plurality of pairs of rectangular apertures, slitting said blanks along pairs of intersecting slit lines terminating at said apertures, slitting one end of each of the blanks to provide bendable portions, folding portions of the blanks adjacent said slits to form anchor portions, shaping said blanks to form semi-cylindrical shell portions, inwardly pressing and shaping portions of the blank defined by said apertures and slit lines to provide tooth portions extending inwardly of each shell portion, and joining pairs of said shell portions along the longitudinal abutting edge portions thereof to form a continuous tubular member, and bending said anchor portions inwardly of the periphery of the tube.

References Cited in the file of this patent

UNITED STATES PATENTS

| | | |
|---|---|---|
| 1,304,493 | Layne | May 20, 1919 |
| 1,450,961 | Otterbein | Apr. 10, 1923 |
| 1,957,235 | Simpson | May 1, 1934 |
| 2,055,771 | McLaughlin | Sept. 29, 1936 |
| 2,483,934 | Richardson | Oct. 4, 1939 |
| 2,233,719 | Vanderveld | Mar. 4, 1941 |
| 2,696,137 | Thomas | Dec. 7, 1954 |
| 2,702,103 | Pfistershamer | Feb. 15, 1955 |